US012172784B2

(12) United States Patent
Kim

(10) Patent No.: US 12,172,784 B2
(45) Date of Patent: Dec. 24, 2024

(54) MEDICINE TRANSFER UNIT AND MEDICINE TRANSFER MODULE INCLUDING THE SAME

(71) Applicant: JVM Co., Ltd., Daegu (KR)

(72) Inventor: Joon Ho Kim, Daegu (KR)

(73) Assignee: JVM CO., LTD., Daegu (KR)

( * ) Notice: Subject to any disclaimer, the term of this patent is extended or adjusted under 35 U.S.C. 154(b) by 348 days.

(21) Appl. No.: 17/190,714

(22) Filed: Mar. 3, 2021

(65) Prior Publication Data

US 2021/0276752 A1 Sep. 9, 2021

(30) Foreign Application Priority Data

Mar. 4, 2020 (KR) ........................ 10-2020-0027352

(51) Int. Cl.

*B65B 39/00* (2006.01)
*A61J 7/00* (2006.01)
*B65B 3/00* (2006.01)
*B65B 5/10* (2006.01)
*A61J 1/03* (2023.01)

(52) U.S. Cl.

CPC ........... *B65B 39/007* (2013.01); *A61J 7/0069* (2013.01); *A61J 7/0084* (2013.01); *B65B 3/003* (2013.01); *B65B 5/103* (2013.01); *A61J 1/035* (2013.01)

(58) Field of Classification Search

CPC ........ A61J 1/035; A61J 7/0084; A61J 7/0069; A61J 1/03; B65B 5/103; B65B 3/003; B65B 39/007; B65B 35/32

See application file for complete search history.

(56) References Cited

U.S. PATENT DOCUMENTS

2006/0273106 A1* 12/2006 Kim .......................... B65B 9/02 221/200
2017/0029152 A1* 2/2017 Shim ....................... B65B 57/20
(Continued)

FOREIGN PATENT DOCUMENTS

CN 101254828 A 9/2008
CN 103771065 A 5/2014
(Continued)

OTHER PUBLICATIONS

Office Action issued Sep. 13, 2021 in Korean Application No. 1020200027352.

(Continued)

*Primary Examiner* — Thomas M Wittenschlaeger
*Assistant Examiner* — Himchan Song
(74) *Attorney, Agent, or Firm* — Maschoff Brennan

(57) ABSTRACT

Disclosed is a medicine transfer unit including a body portion having one side and another side which are opened and an opening or closing portion connected to the body portion to be changeable in state. Here, the opening or closing portion includes a bottom portion configured to close the other side of the body portion in a first state and to open the other side of the body portion when the first state changes to a second state and a jamming prevention portion extending from the bottom portion toward an inside of a sidewall of the body portion on the basis of the first state so as to prevent the stored medicine from being jammed on sidewalls of the body portion and not being dispensed through the other side in the second state.

9 Claims, 9 Drawing Sheets

(56) References Cited

U.S. PATENT DOCUMENTS

| | | | | |
|---|---|---|---|---|
| 2019/0201292 | A1* | 7/2019 | Krezanoski | A61J 7/02 |
| 2020/0391887 | A1* | 12/2020 | Takada | A61J 7/04 |

FOREIGN PATENT DOCUMENTS

| | | | |
|---|---|---|---|
| EP | 2168877 | A2 | 3/2010 |
| JP | 4643448 | B2 | 3/2011 |
| KR | 101513691 | B1 | 4/2015 |

OTHER PUBLICATIONS

Notice of Grant issued Mar. 10, 2022 in Korean Application No. 1020200027352.

Office Action issued Jun. 10, 2022 in European Application No. 21160750.2.

Extended European Search Report issued Jul. 27, 2021 in European Application No. 21160750.2.

Office Action issued May 23, 2022 in Chinese Application No. 202110239269.5.

* cited by examiner

MEDICINE TRANSFER UNIT AND MEDICINE TRANSFER MODULE INCLUDING THE SAME

CROSS-REFERENCE TO RELATED APPLICATION

This application claims priority to and the benefit of Korean Patent Application No. 10-2020-0027352, filed on Mar. 4, 2020, the disclosure of which is incorporated herein by reference in its entirety.

BACKGROUND

1. Field of the Invention

The present invention relates to a medicine transfer unit and a medicine transfer module including the same.

2. Discussion of Related Art

Generally, a blister packaging apparatus refers to an apparatus configured to supply tablets corresponding to cups of a blister pack according to a prescription.

Such cups of the blister pack are generally arranged in a row-column shape in which one row includes cups classified into morning, daytime, evening, and before sleeping for each day of the week.

The apparatus configured to supply and package tablets to the blister pack employs a principle in which a main hopper moves to transfer tablets to cups of the blister pack. However, in this case, since it is inconvenient that the main hopper moves, it is a trend to use a method of moving a blister pack instead of a main hopper.

That is, cups of the blister pack are located to correspond to an outlet of the main hopper and receive tablets while cups of the blister pack are sequentially moved in position.

However, all the conventional methods like the above, that is, the method of moving a main hopper and the method of moving cups of a blister pack, have limitations such as a need for additional power as well as an increase in volume of an apparatus itself due to a movement path therein.

To overcome the above limitations, there is provided a method in which a type of a tablet transfer unit is placed between a main hopper and cups of a blister pack. In the case of a conventional tablet transfer unit, a tablet inputted from a main hopper is jammed on the tablet transfer unit such that it is to stably dispense the tablet into one of cups of the blister pack.

Accordingly, it is urgently necessary to research a tablet transfer unit configured to precisely transfer a tablet.

SUMMARY OF THE INVENTION

The present invention is directed to providing a medicine transfer unit configured to prevent a medicine inputted from a particular space from not being dispensed, which may occur while the medicine is temporarily stored and transferred to a next process, and a medicine transfer module including the medicine transfer unit.

According to an aspect of the present invention, there is provided a medicine transfer unit including a body portion having one side and another side which are opened to allow a medicine inputed through the one side to pass therethrough and to be dispensed through the other side and an opening or closing portion connected to the body portion to be changeable in state and configured to selectively implement any one of a state in which the medicine inputed through the one side is temporarily stored in an internal space of the body portion and a state in which the stored medicine is dispensed through the other side. Here, the opening or closing portion includes a bottom portion configured to close the other side of the body portion in a first state and to open the other side of the body portion when the first state changes to a second state and a jamming prevention portion extending from the bottom portion toward an inside of a sidewall of the body portion on the basis of the first state so as to prevent the stored medicine from being jammed on sidewalls of the body portion and not being dispensed through the other side in the second state.

The opening or closing portion may be rotatably connected to the body portion and may implement any one of the first state and the second state depending on rotation. The jamming prevention portion may extend from any one of sides of the bottom portion toward the inside of the sidewall of the body portion on the basis of the first state.

The jamming prevention portion may cover the inside of the sidewall of the body portion located on an extension side on the basis of the first state.

The jamming prevention portion may form a sidewall, by which the stored medicine is jammed in the first state, with a sidewall opposite the sidewall of the body portion located on the extension side on the basis of the first state among the sidewalls of the body portion.

In the first state, a distance between the jamming prevention portion and a sidewall opposite the sidewall of the body portion located on an extension side on the basis of the first state among the sidewalls of the body portion may be formed so that a part of the other side is smaller than a part of the one side.

A distance between the jamming prevention portion and the opposite side corresponding to the part of the other side may be linearly or nonlinearly decreased toward the other side.

Each of the body portion and the opening or closing portion may include a first attraction portion and a second attraction portion which generate attraction through an interaction so as to maintain the first state and to prevent the stored medicine from being abnormally dispensed in the first state.

According to another aspect of the present invention, there is provided a medicine transfer module including a plurality of medicine transfer units, a movement support unit configured to support the plurality of medicine transfer units to allow the plurality of medicine transfer units to be movable along a certain path and an opening or closing driving unit configured to change a state of the opening or closing portion of each of the plurality of medicine transfer units. Here, each of the plurality of medicine transfer units repetitively moves, due to the movement support unit, to an input position through which a medicine is inputted through the one side and moves, due to the opening or closing driving unit, to a dispense position through which the medicine inputted at the input position is dispensed. Also, the dispense position is a position to which two or more of the plurality of medicine transfer units are applied at the same time.

The two or more medicine transfer units located at the dispense position may be implemented, by the opening or closing driving unit, to change a state of the opening or closing portions thereof at the same time so that the medicines inputted at the input position at the same time may be dispensed through the other side.

The number of the two or more medicine transfer units may correspond to the number of cups included in one row of a blister pack in which a plurality of such cups are arranged in a plurality of rows and a plurality of columns so as to dispense medicines into the cups included in one row of the blister pack at the same time by the opening or closing driving unit.

The opening or closing portion may include a protruding portion which comes into contact with the opening or closing driving unit to change from the first state to the second state. Also, the protruding portion may include a rotational element rotated along a path of a case unit to allow the plurality of medicine transfer units to be stably movable along the certain path.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
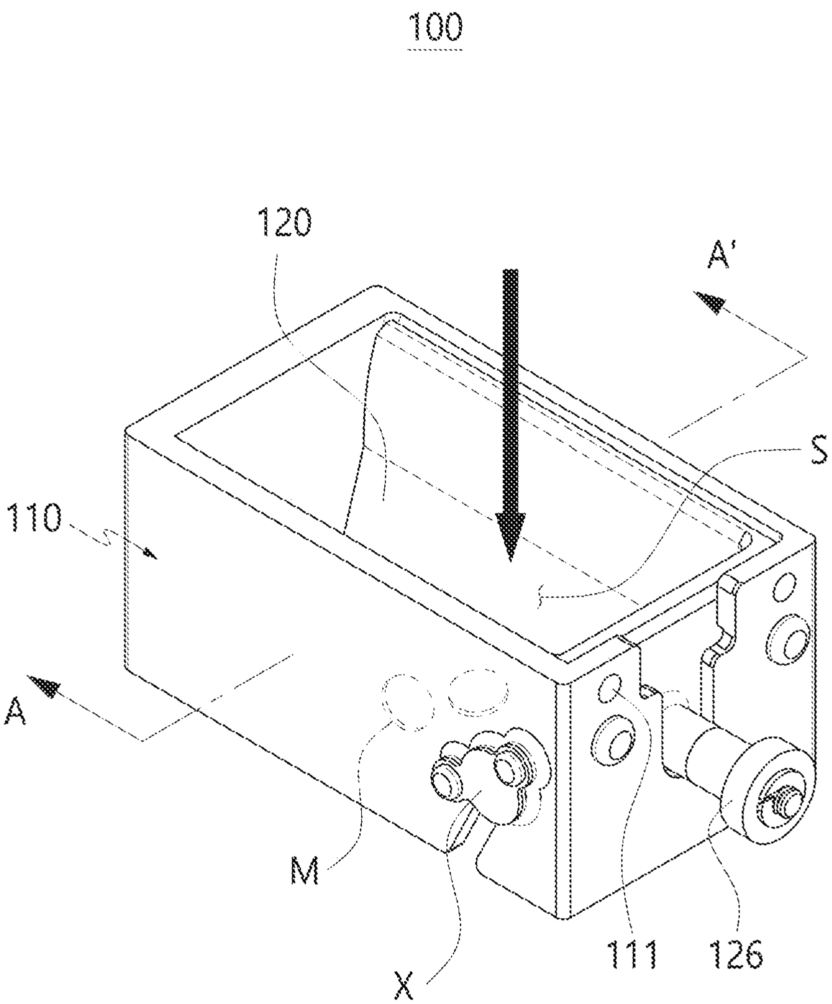
FIG. 1 is a schematic perspective view illustrating a medicine transfer unit according to one embodiment of the present invention.

Hereinafter, detailed embodiments of the present invention will be described in detail with reference to the drawings. However, the concept of the present invention is not limited to the disclosed embodiments, and one of ordinary skill in the art may easily implement retrogressive invention or other embodiments included in the conceptual scope of the present invention through addition, change, deletion, and the like of another component without departing from the conceptual scope, which should be included in the conceptual scope of the present invention.

Also, in the drawings with respect to the embodiments, elements having the same function within the same conceptual scope will be referred to as the same reference numerals.

Figure 2:
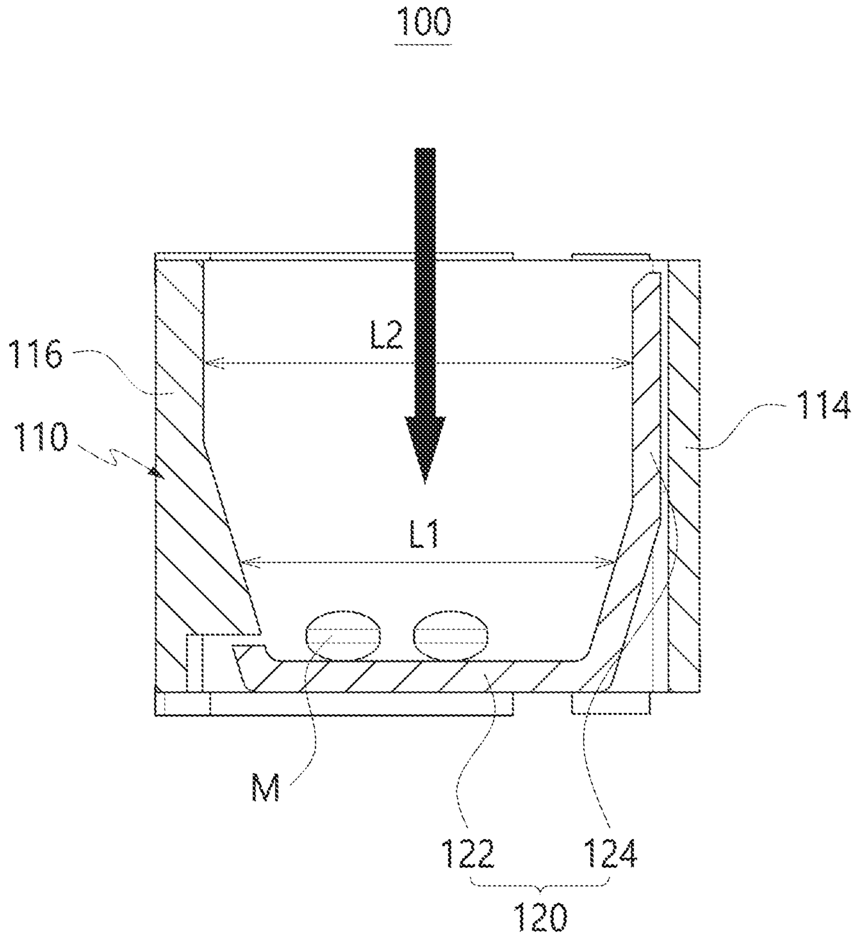
FIG. 2 is a schematic cross-sectional view taken along line AA of FIG. 1.

FIG. 1 is a schematic perspective view illustrating a medicine transfer unit according to one embodiment of the present invention, and FIG. 2 is a schematic cross-sectional view taken along line AA of FIG. 1.

Figure 3:
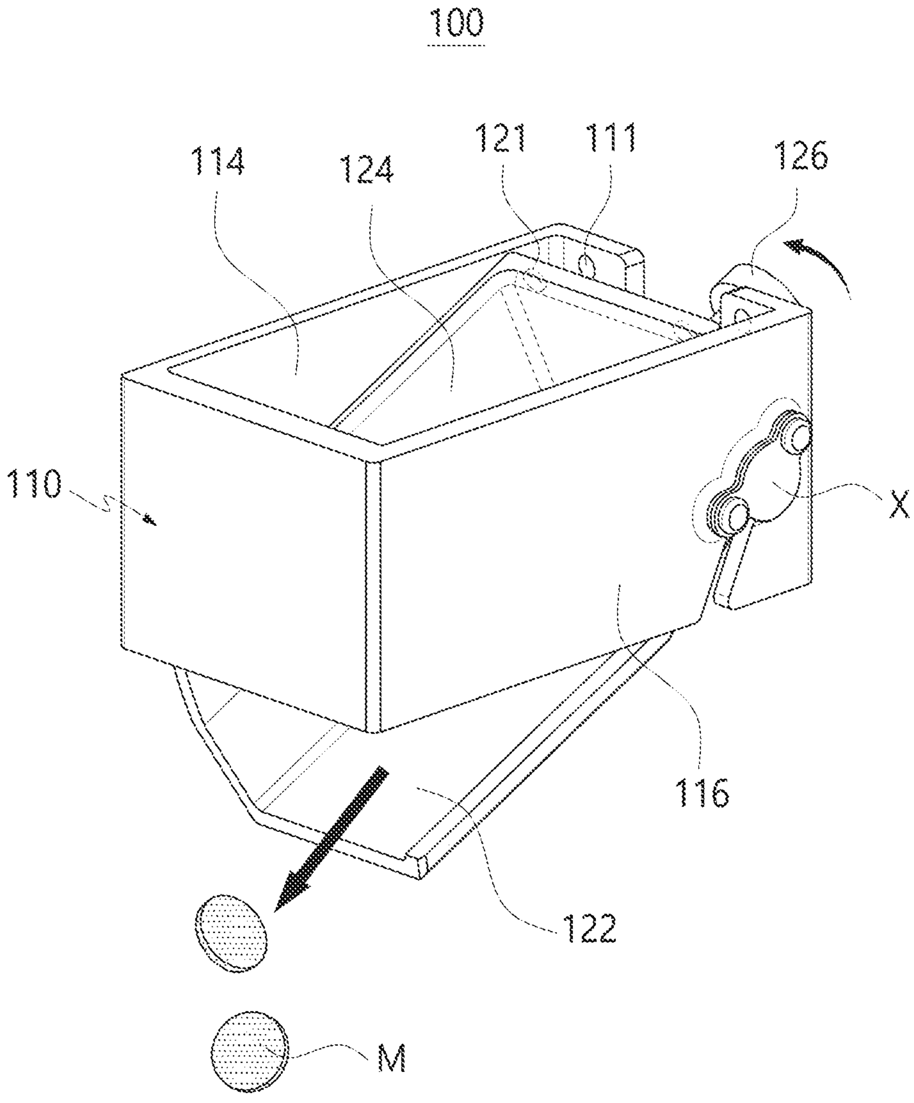
FIGS. 3 and 4 are views illustrating a process in which the medicine transfer unit according to one embodiment of the present invention shifts in phase so that a medicine inputted into one side is dispensed through another side.
Figure 4:
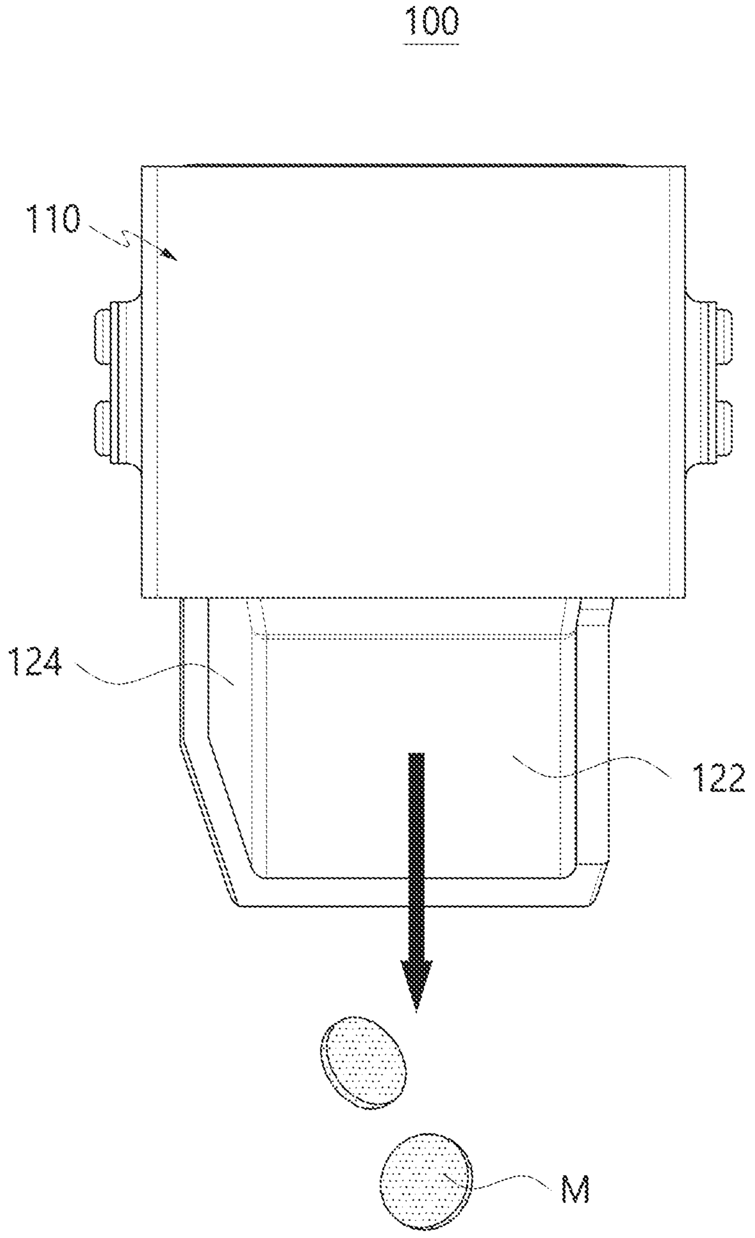

Also, FIGS. 3 and 4 are views illustrating a process in which the medicine transfer unit according to one embodiment of the present invention shifts in phase so that a medicine inputted through one side is dispensed through another side.

Referring to FIGS. 1 to 4, a medicine transfer unit 100 according to one embodiment of the present invention is a type of temporary medicine storage unit configured to accommodate a medicine M inputted through one side and then to dispense the accommodated medicine M to a next process and may include a body portion 110 and an opening or closing portion 120.

The body portion 110 may be a component having one side and another side which are opened so as to allow the medicine M inputted through the one side to pass therethrough and be dispensed through the other side.

For example, the body portion 110 may be implemented to have a quadrangular container shape as shown in the drawings but is not limited thereto and any shapes in which one side and another side are opened and a perimeter of an internal space S is closed may be applicable.

The opening or closing portion 120 may be a type of shutter connected to the body portion 110 to be changeable in phase and configured to selectively implement any one of a state in which the medicine M inputted through the one side is temporarily stored in the internal space S of the body portion 110 and a state in which the stored medicine M is dispensed through the other side.

The opening or closing portion 120 may include a bottom portion 122 configured to close the other side of the body portion 110 in a first state shown in FIGS. 1 and 2 and to open the other side of the body portion 110 when the first state changes to a second state shown in FIGS. 3 and 4.

The opening or closing portion 120 may be rotatably connected to the body portion 110 so as to selectively implement any one of the first state and the second state depending on whether the opening or closing portion 120 rotates, and an external force for the rotation of the opening or closing portion 120 may be implemented by an opening or closing driving unit (not shown).

In detail, when the opening or closing driving unit operates, a protruding portion 126 of the opening or closing portion 120 receives an external force caused by contact in one direction and the opening or closing portion 120 rotates on the basis of a rotating shaft X so that the opening or closing portion 120 changes from the first state to the second state.

The opening or closing portion 120 may include a jamming prevention portion 124 extending from the bottom portion 122 toward an inside of a sidewall 114 of the body portion 110 in order to preventing the stored medicine from being jammed on the sidewall of the body portion 110 and not being dispensed through the other side in the second state.

The jamming prevention portion 124 may extend toward the inside of the sidewall 114 of the body portion 110 from any one of sides of the bottom portion 122 on the basis of the first state and may cover the inside of the sidewall 114 of the body portion 110 located on an extension side on the basis of the first state.

The jamming preventing portion 124 may prevent a phenomenon in which the medicine M is not dispensed through the other side by forming a sidewall, by which the medicine M inputted through the one side is jammed, with a sidewall 116 opposite the sidewall 114 of the body portion 110 located on the extension side on the basis of the first state among sidewalls of the body portion 110 in the first state.

For example, in the case of an opening or closing portion including only a bottom portion and without the jamming prevention portion 124, when medicines are inputted through one side, a phenomenon that one or more medicines are jammed on both sidewalls of a body portion frequently occurs according to sizes or the like of the inputted medicines. Here, even when the opening or closing portion is rotated, the medicines jammed on both sidewalls of the body portion are not dispensed through another side.

The phenomenon causes a problem in precision of transferring medicines and leads to a decrease in efficiency of an apparatus, equipment, or the like in which a medicine transfer unit is used.

In the present invention, the above decrease is effectively overcome using the jamming prevention portion 124 extending toward the inside of the sidewall 114 of the body portion 110 from any one of sides of the bottom portion 122. A detailed principle will be described as follows.

That is, although one or more medicines may be jammed on the jamming prevention portion 124 and the sidewall 116 opposite the sidewall 114 of the body portion 110 located on a side from which the jamming prevention portion 124 extends on the basis of the first state among the sidewalls of the body portion 110 according to sizes or the like of the medicines inputted through the one side, since the jamming prevention portion 124 is rotated when the opening or closing portion 120 rotates, the medicines M may be naturally released from being jammed and precisely dispensed through the other side.

In the first state, a distance between the jamming prevention portion 124 and the sidewall 116 opposite the sidewall 114 of the body portion 110 located on the side from which the jamming prevention portion 124 extends on the basis of the first state among the sidewalls of the body portion 110 may be formed so that a part L1 of the other side is smaller than a part L2 of the one side.

Here, since a distance between the opposite sidewall 116 and the jamming prevention portion 124 which corresponds to the part of the other side may be linearly or nonlinearly decreased toward the other side, the medicines inputted through the one side are more stably dispensed through the other side in the second state.

Meanwhile, when the first state changes to the second state due to an operation of the opening or closing driving unit and then a driving force of the opening or closing driving unit is removed, the opening or closing portion 120 may naturally return to the first state due to a restoring force according to elastic deformation of an elastic portion (not shown).

Here, the elastic portion may be a coil spring mounted on the rotating shaft X but is not limited thereto and may be a coil spring mounted on an additional shaft mounted between the sidewalls 114 and 116 of the body portion 110.

It has been described above that the opening or closing portion 120 rotates on the basis of the rotating shaft X due to the operation of the opening or closing driving unit and changes from the first state to the second state so that the medicines M stored in the internal space S of the body portion 110 are dispensed.

Here, when the opening or closing driving unit does not perform the operation, the opening or closing portion 120 remains in the first state due to the elastic portion so as not to dispense the medicines M stored in the internal space S. Even when an abnormal external force is applied in addition to the operation of the opening or closing driving unit, the first state may be stably maintained by a certain level of attraction in addition to the elastic force of the elastic portion so as to prevent the medicines M from being abnormally dispensed.

In detail, the body portion 110 and the opening or closing portion 120 may each include a first attraction portion 111 and a second attraction portion 121 which are components between which attraction is present due to a magnetic force.

For example, both the first attraction portion 111 and the second attraction portion 121 may be implemented as magnets or the first attraction portion 111 may be implemented as a magnet while the second attraction portion 121 may be implemented as iron and the like which reacts to a magnet.

On the other hand, the second attraction portion 121 may be implemented as a magnet and the first attraction portion 111 may be implemented as iron or the like which reacts to a magnet.

Attraction generated by an interaction between the first attraction portion 111 and the second attraction portion 121 may prevent rotation of the opening or closing portion 120 with the elastic portion so as to prevent the medicines M from being abnormally dispensed even when an abnormal externa force is applied.

Here, the opening or closing driving unit provides a driving force greater than the attraction acting between the first attraction portion 111 and the second attraction portion 121 and the elastic force of the elastic portion so that the opening or closing portion 120 may change from the first state to the second state. When the driving force of the opening or closing driving unit is removed, the opening or closing portion 120 may stably return to the first state due to the attraction generated by the interaction between the first attraction portion 111 and the second attraction portion 121 and the attraction of the elastic portion.

Figure 5:
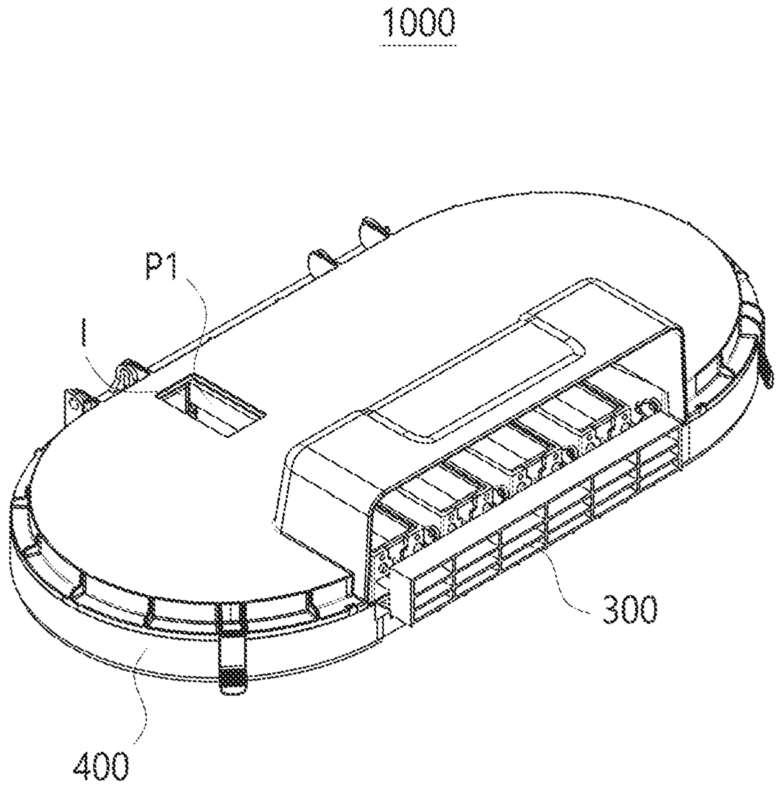
FIG. 5 is a schematic perspective view illustrating a medicine transfer module according to another embodiment of the present invention.
Figure 6:
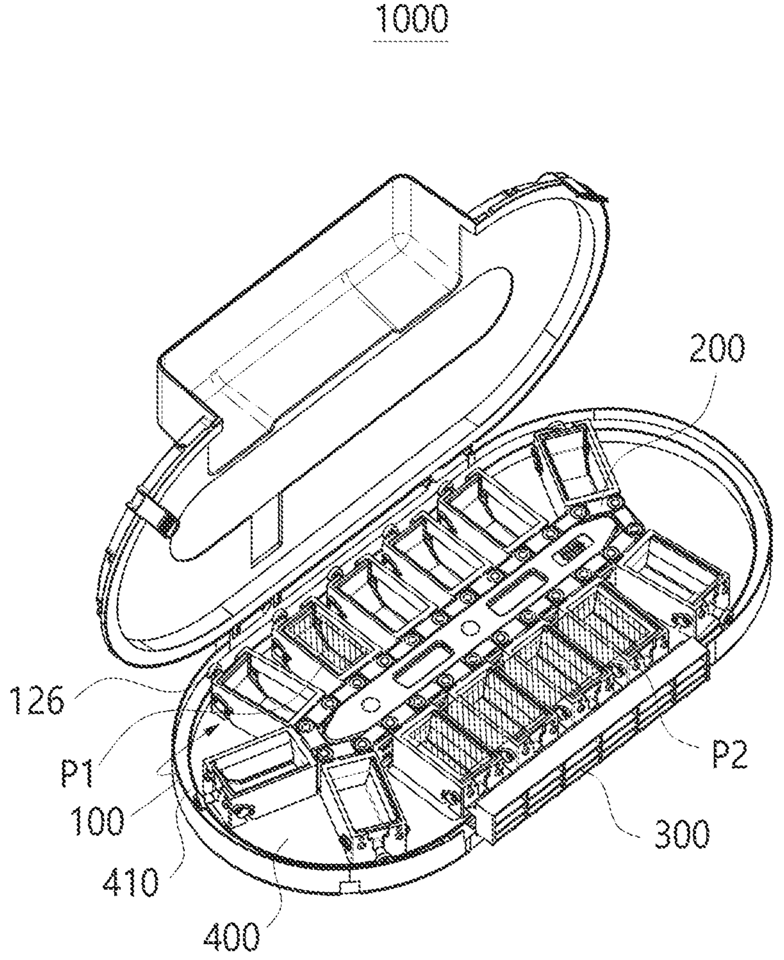
FIG. 6 is a view illustrating internal components of the medicine transfer module according to another embodiment of the present invention.

FIG. 5 is a schematic perspective view illustrating a medicine transfer module according to another embodiment of the present invention, and FIG. 6 is a view illustrating internal components of the medicine transfer module according to another embodiment of the present invention.

Referring to FIGS. 5 and 6, a medicine transfer module 1000 according to another embodiment of the present invention is a module implemented using the medicine transfer unit 100 described above with reference to FIGS. 1 to 4 and may include a plurality of such medicine transfer units 100, a movement support unit 200, an opening or closing driving unit 300, and the like.

The movement support unit 200 is a component configured to support the plurality of medicine transfer units 100 to allow the plurality of medicine transfer units 100 to be movable along a certain path and may be a type of chain rotatable in an infinite track by a driving unit (not shown) such as a motor and the like.

However, the movement support unit 200 does not necessarily need to be implemented as a chain, and for example, any components configured to allow the plurality of medicine transfer units 100 to move along a certain path will be applicable.

Each of the plurality of medicine transfer units 100 may be connected to the movement support unit 200 and may move along a certain path in connection with a shift in position of the movement support unit 200. Here, a rotational element of the protruding portion 126 is rotated along a path 410 of a case unit 400 so as to implement smoother positional movement.

Also, each of the plurality of medicine transfer units 100 may stably remain in the first state due to the elastic force of the elastic portion and the attraction by the first attraction portion 111 and the second attraction portion 121 which have been described above with reference to FIGS. 1 to 4 while being moved along the certain path.

Meanwhile, each of the plurality of medicine transfer units 100 may repetitively move, due to the movement support unit 200, to an input position P1 (shown as a hatched area) into which the medicine M is inputted from the one side and move, due to the opening or closing driving unit 300, to a dispense position P2 (shown as a hatched area) through which the medicine M inputted at the input position P1 is dispensed through the other side.

Here, the number and positions of such input positions P1 are not particularly determined and may be set in a variety of positions, and for example, may be a single position corresponding to an inlet I of the case unit 400 shown in the drawings.

Meanwhile, the dispense position P2 may be a position to which two or more of the plurality of medicine transfer units 100 are applied simultaneously among the plurality of medicine transfer units 100.

The number of the two or more medicine transfer units located on the dispense position P2 may correspond to the number of cups C included in one row of a blister pack BP (refer to FIG. 7) in which a plurality of such cups C are arranged in a plurality of rows and a plurality of columns, and may be, for example, four.

While each of the four medicine transfer units 100 located on the dispense position P2 passes through the input position P1, one dose of medicine corresponding to morning, one dose of medicine corresponding to daytime, one dose of medicine corresponding to evening, and one dose of medicine to be taken before sleeping may be inputted thereinto and temporarily stored therein.

The rotational elements of the protruding portions 126 of the four medicine transfer units 100 located at the dispense position P2 depart from the path 410 of the case unit 400 and are located on a path 310 (refer to FIG. 9B) of the opening or closing driving unit 300. In this case, as the opening or closing driving unit 300 moves in position, each of the opening or closing portions 120 changes in state so that the medicines M inputted at the input position P1 are dispensed through the other side.

Here, a driving force for moving the opening or closing driving unit 300 in position may be provided by a variety of components and may be provided, for example, using a method of transferring torque of a motor by a connection unit such as a gear, link, or the like.

The opening or closing portions 120 of the four medicine transfer units 100 located at the dispense position P2 are rotated by counterclockwise movement in position of the opening or closing driving unit 300 so that the stored medicines are accurately dispensed into a space for a following process without a jamming phenomenon in the body portion 110.

The space for the next process may be the cups C included in one row of the blister pack BP. Eventually, the medicines M are dispensed into the cups C included in one row of the blister pack BP at the same time due to one time movement in position of the opening or closing driving unit 300.

Hereinafter, a process of transferring the medicines M by the medicine transfer module 1000 described above will be described in detail.

FIGS. 7 to 9B are views illustrating a process in which medicines are dispensed into cups included in one row of a blister pack by the medicine transfer module according to another embodiment of the present invention.

Figure 7:
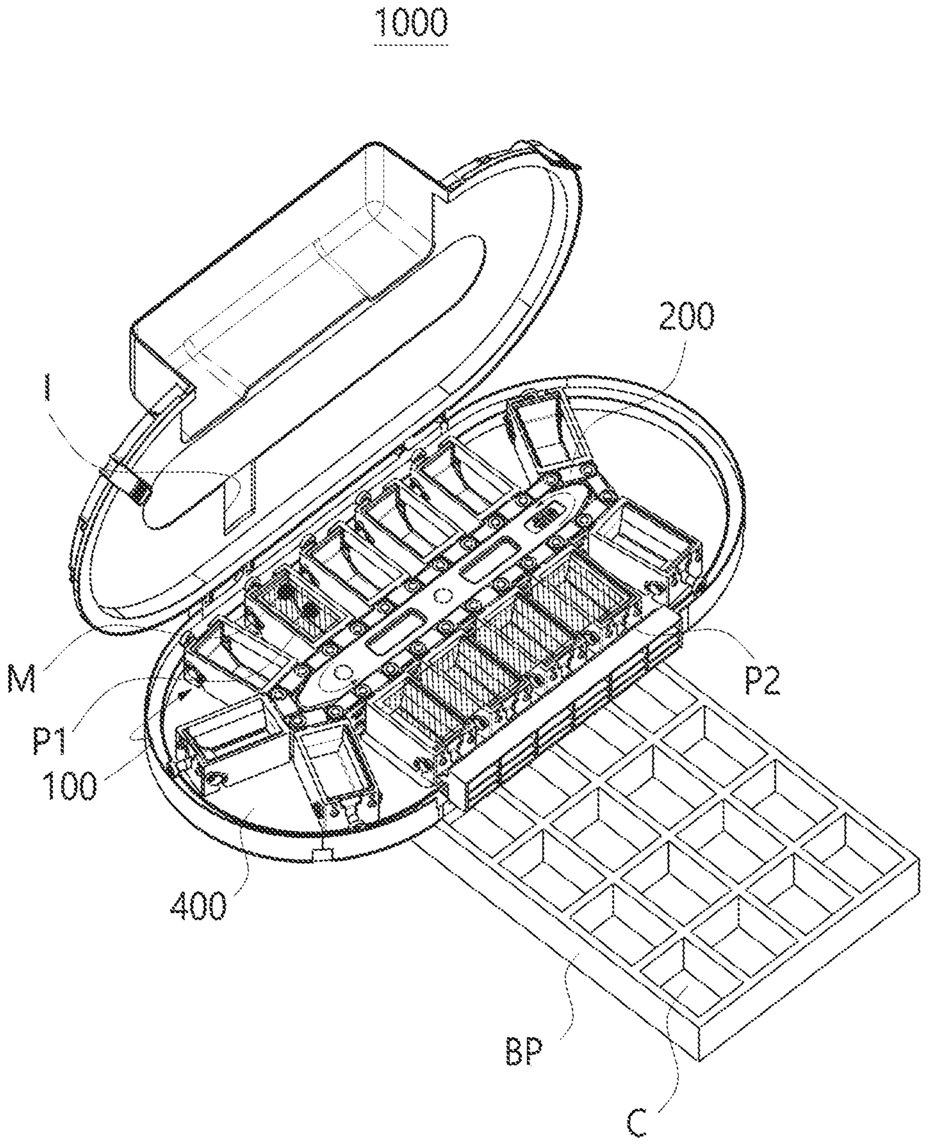
FIGS. 7 to 9B are views illustrating a process in which medicines are dispensed into cups included in one row of a blister pack by the medicine transfer module according to another embodiment of the present invention.

Referring to FIG. 7, the plurality of medicine transfer units 100 move on the certain path due to the movement support unit 200, and each of the medicine transfer units 100 receives one dose of medicines M at the input position P1.

Here, input of the medicines M at the input position P1 may be manually inputted through the inlet I of the case unit 400 by a general practitioner, a pharmacist, or the like.

Otherwise, input may be automatically performed from a medicine storage unit (not shown) which stores a variety of medicines through the inlet I of the case unit 400 on the basis of a medicine dispense request (for example, a prescription of a patient).

Figure 8:
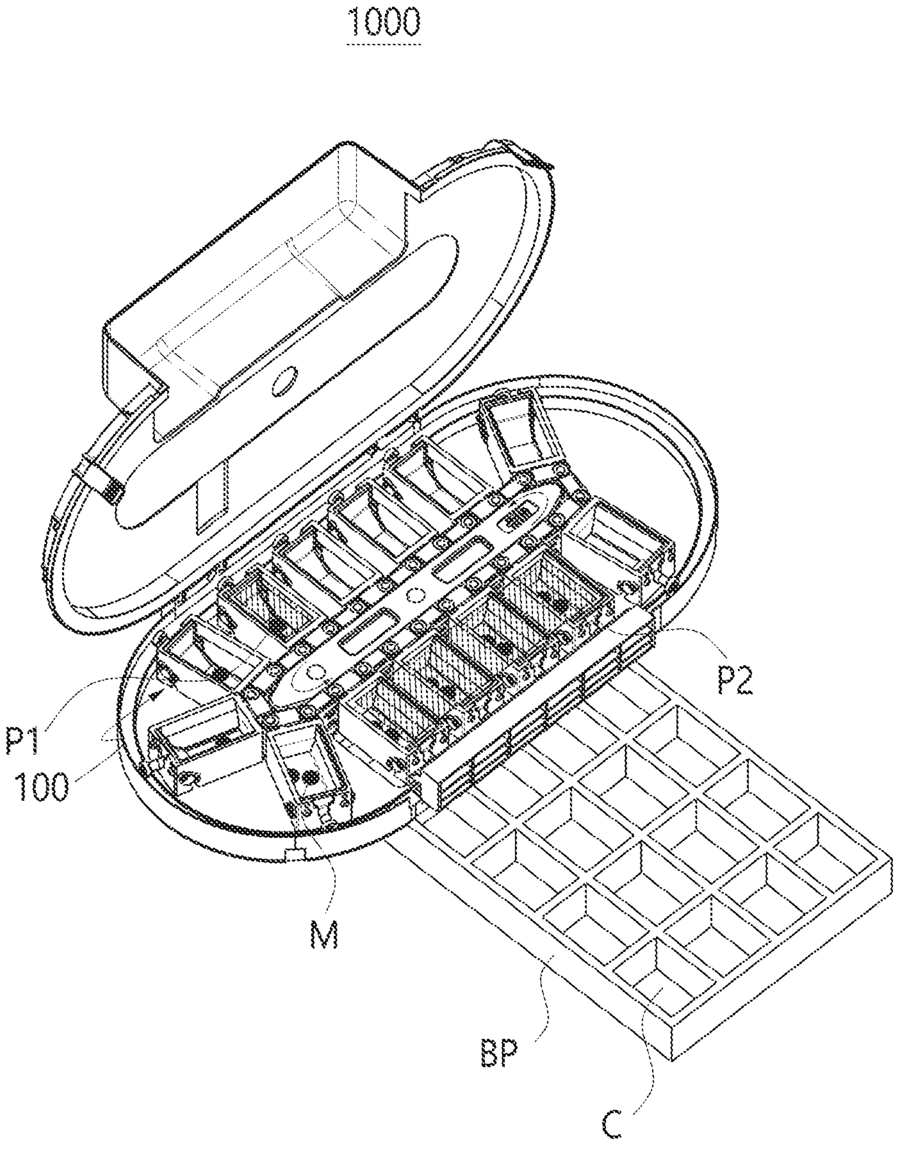
Figure 9A:
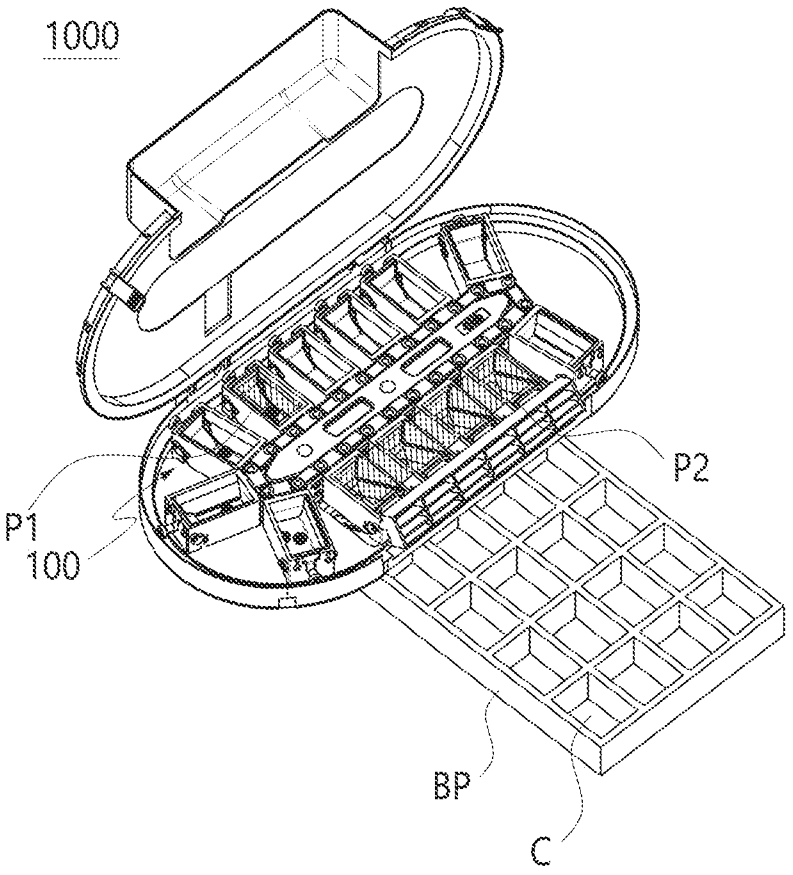
Figure 9B:
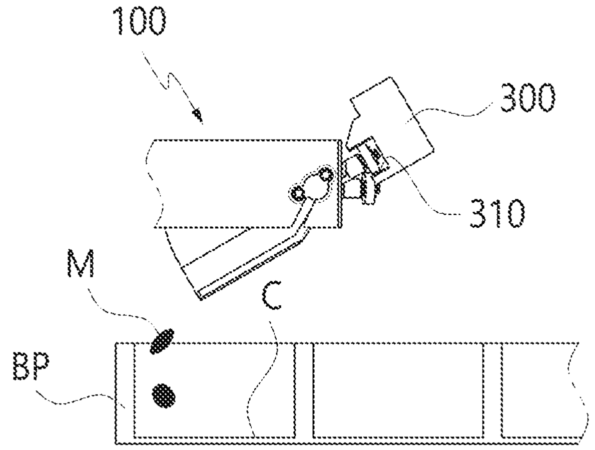

Referring to FIGS. 8 to 9B, the medicine transfer unit 100 into which the medicines M are inputted at the input position P1 is located at the dispense position P2 due to the movement support unit 200. When a total of four medicine transfer units 100 are located at the dispense position P2, the opening or closing driving unit 300 operates.

Here, the number of the medicine transfer units 100 located at the dispense position P2 is four overall and may correspond to the number of the cups C included in one row of the blister pack BP in which the plurality of cups are arranged in a plurality of rows and a plurality of columns as described above.

When the cups C included in one row of the blister pack BP are located in a direction toward the other side of the dispense position P2 and the medicine transfer units 100 arrive at the dispense position P2, the opening or closing driving unit 300 operates so that the medicines M are inputted into the cups C included in one row of the blister pack BP at the same time.

Subsequently, movement in position of the medicine transfer unit 100, movement in position of the blister pack BP, the operation of the opening or closing driving unit 300, and the like are repetitively performed so that the medicines M are inputted into all cups C included in the blister pack BP and the blister pack BP is replaced with a new one.

According to the present invention, a medicine transfer unit may increase precision of transferring a medicine inputted from a particular space such as a main hopper and the like by preventing the medicine from not being dispensed during a process in which the medicine is temporarily stored and transferred to a next process.

Also, a medicine transfer module including the medicine transfer unit may improve efficiency in packaging by increasing a speed and precision of packaging during a process of packaging the medicine in a blister form.

Although the components and features of the present invention have been described on the basis of the embodiments of the present invention, the present invention is limited thereto. Also, it is apparent to those skilled in the art that a variety of changes and modifications may be made without departing from the concept and scope of the present invention. Therefore, it should be noted that the changes and modifications are included in the claims.

What is claimed is:

1. A medicine transfer unit comprising:

a body portion having one side and another side which are opened to allow a medicine inputted through the one side to pass therethrough and to be dispensed through the other side; and an opening or closing portion rotatably connected to the body portion to be changeable in state and configured to selectively implement any one of a first state in which the medicine inputted through the one side is temporarily stored in an internal space of the body portion and a second state in which the stored medicine is dispensed through the other side, wherein the opening or closing portion comprises a bottom portion configured to close the other side of the body portion in the first state and to open the other side of the body portion when the first state changes to the second state and a first jamming prevention portion extending from a first side of the bottom portion toward an inside of a first sidewall of the body portion in the first state and covering the inside of the first sidewall of the body portion in the first state, thereby preventing the stored medicine from being jammed between the first jamming prevention portion and a second sidewall opposite the first sidewall of the body portion and blocking dispensing through the other side in the second state and a second jamming prevention portion extending from a second side of the bottom portion adjacent to the first side toward an inside of a third sidewall of the body portion in the first state and covering the inside of the third sidewall of the body portion in the first state, thereby preventing the stored medicine from being jammed between the second jamming prevention portion and a fourth sidewall opposite the third sidewall of the body portion and blocking dispensing through the other side in the second state, wherein when the stored medicine is jammed on the first jamming prevention portion and the second sidewall of the body portion or the second jamming prevention portion and the fourth sidewall of the body portion in the first state, rotation of the first and second jamming prevention portions when the opening or closing portion rotates releases the medicine from being jammed and the medicine is dispensed through the other side.

2. The medicine transfer unit of claim 1, wherein the first jamming prevention portion comprises a first jamming prevention sidewall and the second jamming prevention portion comprises a second jamming prevention sidewall.

3. The medicine transfer unit of claim 1, wherein in the first state, a distance between the first jamming prevention portion and the second sidewall or the second jamming prevention portion and the fourth sidewall of the body portion is formed so that a part of the other side is smaller than a part of the one side.

4. The medicine transfer unit of claim 3, wherein the distance between the first jamming prevention portion and the second sidewall of the body portion is linearly or nonlinearly decreased approaching the first side of the bottom portion.

5. The medicine transfer unit of claim 1, wherein the body portion comprises at least one first attraction portion, and the opening or closing portion comprises at least one second attraction portion, and wherein the first attraction portion and the second attraction portion generate attraction through magnetic interaction so as to maintain the first state and to prevent the stored medicine from being abnormally dispensed in the first state.

6. A medicine transfer module comprising:

a plurality of such medicine transfer units of claim 1;

a movement support unit configured to support the plurality of medicine transfer units to allow the plurality of medicine transfer units to be movable along a certain path; and an opening or closing driving unit configured to change a state of the opening or closing portion of each of the plurality of medicine transfer units, wherein each of the plurality of medicine transfer units repetitively moves, due to the movement support unit, to an input position through which a medicine is inputted through the one side and moves, due to the opening or closing driving unit, to a dispense position through which the medicine inputted at the input position is dispensed toward the other side, and wherein the dispense position is a position to which two or more of the plurality of medicine transfer units are applied at the same time among the plurality of medicine transfer units.

7. The medicine transfer module of claim 6, wherein the two or more medicine transfer units located at the dispense position are implemented, by the opening or closing driving unit, to change a state of the opening or closing portions thereof at the same time so that the medicines inputted at the input position at the same time are dispensed through the other side.

8. The medicine transfer module of claim 7, wherein the number of the two or more medicine transfer units corresponds to the number of cups included in one row of a blister pack in which a plurality of such cups are arranged in a plurality of rows and a plurality of columns so as to dispense medicines into the cups included in one row of the blister pack at the same time by the opening or closing driving unit.

9. The medicine transfer module of claim 6, wherein the opening or closing portion comprises a protruding portion which comes into contact with the opening or closing driving unit to change from the first state to the second state, and wherein the protruding portion comprises a rotational element rotated along a path of a case unit to allow the plurality of medicine transfer units to be stably movable along the certain path.

* * * * *